United States Patent
Prins

(10) Patent No.: US 10,107,531 B2
(45) Date of Patent: Oct. 23, 2018

(54) METHOD FOR CONTROLLING A CHILLER SYSTEM

(71) Applicant: Danfoss A/S, Nordborg (DK)

(72) Inventor: Jan Prins, Nordborg (DK)

(73) Assignee: Danfoss A/S, Nordborg (DK)

( * ) Notice: Subject to any disclaimer, the term of this patent is extended or adjusted under 35 U.S.C. 154(b) by 734 days.

(21) Appl. No.: 14/419,822

(22) PCT Filed: Jul. 12, 2013

(86) PCT No.: PCT/DK2013/050239
§ 371 (c)(1),
(2) Date: Feb. 5, 2015

(87) PCT Pub. No.: WO2014/032672
PCT Pub. Date: Mar. 6, 2014

(65) Prior Publication Data
US 2015/0184885 A1    Jul. 2, 2015

(30) Foreign Application Priority Data
Aug. 31, 2012 (DK) .......................... PA 2012 00544

(51) Int. Cl.
*F24F 11/06* (2006.01)
*F25B 25/00* (2006.01)
(Continued)

(52) U.S. Cl.
CPC .............. *F25B 25/005* (2013.01); *F24F 3/06* (2013.01); *F24F 11/83* (2018.01); *F25B 49/02* (2013.01);
(Continued)

(58) Field of Classification Search
CPC ...... F24F 11/06; F24F 3/06; F24F 2011/0061; F24F 2011/0083; Y02B 30/745;
(Continued)

(56) References Cited

U.S. PATENT DOCUMENTS 4,274,264 A    6/1981   Andres
4,327,559 A    5/1982   Spethmann
(Continued)

FOREIGN PATENT DOCUMENTS

CN    101142455 A    3/2008
EP    0 829 784 A1   3/1998
(Continued)

OTHER PUBLICATIONS

Norman S Nise, Control System Engineering Sixth Edition , 2011, pp. 237-238.*
(Continued)

*Primary Examiner* — Frantz Jules
*Assistant Examiner* — Nelson Nieves
(74) *Attorney, Agent, or Firm* — McCormick, Paulding & Huber LLP

(57) ABSTRACT

A method for controlling a chiller system, the chiller system comprising a primary side in the form of a vapor compression system, and a secondary side, is disclosed. The secondary side comprises a variable speed pump for providing a secondary fluid flow through the evaporator of the primary side in such a manner that heat exchange takes place between refrigerant of the primary side and fluid of the secondary side in the evaporator, the secondary side further comprising a temperature sensor arranged in the secondary fluid flow. The method comprises the steps of monitoring a temperature of the secondary fluid flow by means of the temperature sensor, and controlling the compressor capacity and the speed of the variable speed pump on the basis of the monitored temperature, and in order to obtain a predetermined setpoint temperature, in such a manner that the closed loop gain of the chiller system, $K=K_p \cdot K_e$, where $K_p$ is the gain of the compressor capacity controller and $K_e$ is the gain of the evaporator, is kept substantially constant.

17 Claims, 4 Drawing Sheets

(51) Int. Cl.
*F25B 49/02* (2006.01)
*G05D 23/19* (2006.01)
*F24F 3/06* (2006.01)
*F24F 11/83* (2018.01)
*F24F 11/63* (2018.01)
*F24F 11/85* (2018.01)

(52) U.S. Cl.
CPC .......... *G05D 23/1919* (2013.01); *F24F 11/63* (2018.01); *F24F 11/85* (2018.01); *F25B 2500/19* (2013.01); *F25B 2600/0253* (2013.01); *F25B 2600/13* (2013.01); *F25B 2700/21172* (2013.01); *F25B 2700/21173* (2013.01); *Y02B 30/741* (2013.01); *Y02B 30/745* (2013.01)

(58) Field of Classification Search
CPC ........ F25B 2500/19; F25B 2700/21173; F25B 2700/21172; F25B 2600/13
See application file for complete search history.

(56) References Cited

U.S. PATENT DOCUMENTS

| | | | | |
|---|---|---|---|---|
| 4,689,967 | A * | 9/1987 | Han | F25B 49/022 |
| | | | | 62/201 |
| 5,000,009 | A * | 3/1991 | Clanin | F25B 41/062 |
| | | | | 62/115 |
| 5,600,960 | A | 2/1997 | Schwedler et al. | |
| 5,946,926 | A | 9/1999 | Hartman | |
| 6,085,532 | A | 7/2000 | Sibik | |
| 6,666,042 | B1 * | 12/2003 | Cline | F24F 3/065 |
| | | | | 62/175 |
| 6,871,509 | B2 | 3/2005 | Grabon et al. | |
| 2004/0065099 | A1 | 4/2004 | Grabon et al. | |
| 2007/0000266 | A1 * | 1/2007 | McEnaney | B60H 1/321 |
| | | | | 62/228.4 |
| 2011/0041532 | A1 * | 2/2011 | Preston | F24F 11/0079 |
| | | | | 62/186 |
| 2011/0276182 | A1 | 11/2011 | Seem et al. | |
| 2012/0131948 | A1 * | 5/2012 | Yamashita | F24F 3/06 |
| | | | | 62/513 |
| 2012/0180508 | A1 * | 7/2012 | Endoh | F24D 11/0221 |
| | | | | 62/159 |
| 2013/0074526 | A1 * | 3/2013 | Rollinger | F04B 27/0895 |
| | | | | 62/61 |
| 2013/0074537 | A1 * | 3/2013 | Rollinger | B60H 1/3216 |
| | | | | 62/228.1 |
| 2013/0098085 | A1 * | 4/2013 | Judge | H05K 7/20827 |
| | | | | 62/180 |
| 2013/0205815 | A1 * | 8/2013 | Izadi-Zamanabadi | F25B 41/062 |
| | | | | 62/115 |
| 2013/0219936 | A1 * | 8/2013 | Yamamoto | F24F 11/02 |
| | | | | 62/126 |
| 2014/0305152 | A1 * | 10/2014 | Morimoto | F25B 49/02 |
| | | | | 62/126 |

FOREIGN PATENT DOCUMENTS

JP      S59 103104 A      6/1984
WO    2008 138367 A1   11/2008

OTHER PUBLICATIONS

Danish Search Report Serial No. PA201200544 dated Apr. 15, 2013.
International Search Report for PCT Serial No. PCT/DK2013/050239 dated Oct. 21, 2013.

* cited by examiner

METHOD FOR CONTROLLING A CHILLER SYSTEM

CROSS-REFERENCE TO RELATED APPLICATION

This application is entitled to the benefit of and incorporates by reference subject matter disclosed in the International Patent Application No. PCT/DK2013/050239 filed on Jul. 12, 2013 and Danish Patent Application 2012 00544 filed Aug. 31, 2012.

FIELD OF THE INVENTION

The present invention relates to a method for controlling a chiller system. More particularly, the present invention relates to a method for controlling a closed loop gain of a temperature control of the chiller system. When controlling a chiller system in accordance with the method of the present invention, the energy consumption of the chiller system can be reduced as compared to the energy consumption of chiller systems being controlled in accordance with prior art methods.

BACKGROUND

In a chiller system, heat is removed from a secondary fluid flow. The secondary fluid flow may be a liquid flow, e.g. a flow of water or brine. As an alternative, the secondary fluid may be condensed during heat exchange. This is, e.g., the case when the chiller system is a pumped $CO_2$ system, in which case the secondary fluid is $CO_2$.

A chiller system comprises a primary side, often in the form of a vapour compression system, and a secondary side containing the secondary fluid flow. Heat exchange takes place between refrigerant flowing in the primary side and secondary fluid flowing in the secondary side, typically in an evaporator of the primary side.

The secondary fluid flow is typically driven by means of a pump. In order to ensure that a sufficient cooling capacity is available in situations of high cooling demand, the pump is normally operated at its highest level in all situations, also when it is not required by the cooling demand. Thereby the energy consumption of the pump is relatively high.

U.S. Pat. No. 6,871,509 discloses a chiller system with a primary side and a secondary side. The primary side is in the form of a vapour compression system comprising a compressor, a condenser, an expansion device and an evaporator. The secondary side provides a flow of water passing through the evaporator in such a manner that heat exchange takes place between the refrigerant of the primary side and the water of the secondary side. Thus, the evaporator absorbs heat from water circulating in the secondary loop. A pump is provided for driving the water flow through the evaporator. When the chiller system is activated, the pump begins circulating water through the evaporator. Thus, the pump is either operated at full speed, or is not operated at all.

SUMMARY

It is an object of embodiments of the invention to provide a method for controlling a chiller system, in which the energy consumption of the system is reduced as compared to prior art methods.

It is a further object of embodiments of the invention to provide a method for controlling a chiller system, in which the energy consumption of the system can be reduced, while ensuring that a required cooling capacity is available.

The invention provides a method for controlling a chiller system, the chiller system comprising a primary side and a secondary side, the primary side comprising a compressor with variable capacity, a heat rejecting heat exchanger, an expansion device, and an evaporator arranged in a refrigerant path, and the secondary side comprising a variable speed pump for providing a secondary fluid flow through the evaporator in such a manner that heat exchange takes place between refrigerant of the primary side and fluid of the secondary side in the evaporator, the secondary side further comprising a temperature sensor arranged in the secondary fluid flow, the method comprising the steps of:

monitoring a temperature of the secondary fluid flow by means of the temperature sensor, controlling the compressor capacity and the speed of the variable speed pump on the basis of the monitored temperature, and in order to obtain a predetermined setpoint temperature, wherein the compressor capacity and the speed of the variable speed pump are controlled in such a manner that the closed loop gain of the chiller system, $K=K_p \cdot K_e$, where $K_p$ is the gain of the compressor capacity controller and $K_e$ is the gain of the evaporator, is kept substantially constant.

The invention relates to a method for controlling a chiller system. More particularly, the method of the invention is for controlling a closed loop gain of the chiller's temperature control.

In the present context the term 'chiller system' should be interpreted to mean a system comprising a primary side and a secondary side, where the primary side removes heat from the secondary side due to heat exchange between a fluid flowing in the primary side and fluid flowing in the secondary side. The primary side is preferably in the form of a vapour compression system, i.e. a system in which refrigerant is alternatingly compressed and expanded. The fluid of the secondary side may advantageously be used for providing cooling to a number of locations, e.g. a number of rooms needing air conditioning or a number of refrigeration cabinets in a supermarket.

The primary side comprises a compressor with variable capacity, a heat rejecting heat exchanger, an expansion device and an evaporator arranged in a refrigerant path. Thus, the primary side is in the form of a vapour compression system, where refrigerant is alternatingly compressed in the compressor and expanded in the expansion device, and heat exchange takes place in the heat rejecting heat exchanger and in the evaporator.

The compressor has variable capacity. Thus, the compressor may, e.g., be a variable speed compressor. In this case the speed of the compressor may be variable in a continuous or in a stepwise manner. As an alternative, the compressor may be in the form of two or more compressors arranged in a compressor rack. In this case, the compressor capacity can be varied by switching on or off an appropriate number of compressors. As another alternative, the compressor may be in the form of screw compressor. In this case the compressor capacity can be varied by varying the position of the slide of the screw compressor. Alternatively, the variable capacity of the compressor may be obtained in any other suitable manner.

The heat rejecting heat exchanger receives compressed refrigerant from the compressor. In the heat rejecting heat exchanger heat exchange takes place between the refrigerant flowing in the primary system and the ambient, in such a manner that heat is transferred from the refrigerant to the ambient. The heat rejecting heat exchanger may be a condenser, in which case the refrigerant is at least partly condensed when passing through the heat rejecting heat exchanger. As an alternative, the heat rejecting heat exchanger may be a gas cooler, in which case gaseous refrigerant is cooled in the heat rejecting heat exchanger, but no phase change takes place. A gas cooler is normally applied in transcritically operated vapour compression systems, e.g. vapour compression system using $CO_2$ as refrigerant.

In the expansion device the refrigerant is expanded. The expansion device may, e.g., be in the form of an expansion valve, e.g. having a variable opening degree. As an alternative, the expansion device may be a fixed orifice.

The evaporator receives expanded refrigerant from the expansion device. In the evaporator heat exchange takes place between the refrigerant flowing in the primary side and the fluid of the secondary side, in such a manner that heat is transferred from the secondary fluid to the refrigerant. The refrigerant is at least partly evaporated when passing through the evaporator. The evaporator may be in the form of a single evaporator comprising a single evaporator coil or two or more evaporator coils arranged in parallel. As an alternative, the evaporator may comprise two or more evaporators arranged in parallel in the refrigerant path.

The secondary side comprises a variable speed pump for providing a secondary fluid flow through the evaporator. Since the speed of the pump is variable, the secondary fluid flow through the evaporator is also variable. Thereby it is possible to control the heat exchange taking place in the evaporator, and thereby the cooling capacity of the chiller system.

The fluid flowing in the secondary system may be a liquid, such as water or brine. As an alternative, the fluid may be at least partly gaseous. This is, e.g., the case when the chiller system is a pumped $CO_2$ system, where $CO_2$ is circulated in the secondary system.

A temperature sensor is arranged in the secondary fluid flow. Thereby the temperature of the secondary fluid can be measured. The temperature sensor may be arranged at or near an outlet opening of the evaporator. In this case the temperature sensor measures the temperature of secondary fluid leaving the evaporator, i.e. after heat exchange with the refrigerant has taken place. As an alternative, the temperature sensor may be arranged at or near an inlet opening of the evaporator. In this case the temperature sensor measures the temperature of secondary fluid entering the evaporator, i.e. before heat exchange with the refrigerant takes place. As another alternative, the chiller system may comprise two temperature sensors arranged in the secondary fluid flow, one arranged at the inlet opening of the evaporator, and one arranged at the outlet opening of the evaporator.

The method of the invention comprises the step of monitoring a temperature of the secondary fluid by means of the temperature sensor. As described above, the monitored temperature may be the temperature of fluid leaving the evaporator or the temperature of fluid entering the evaporator.

Next the compressor capacity and the speed of the variable speed pump are controlled on the basis of the monitored temperature, and in order to obtain a predetermined setpoint temperature. Thus, a feedback control is performed, where the temperature of the secondary fluid is the control parameter, and the control is performed by varying the compressor capacity as well as the speed of the variable speed pump, thereby varying the secondary fluid flow through the evaporator.

The compressor capacity and the speed of the variable speed pump are controlled in such a manner that the closed loop gain of the chiller system is kept substantially constant. In the present context the term 'substantially constant' should be interpreted to mean that the closed loop gain is kept constant or within a small range.

The closed loop gain, K, of the chiller system is defined as the product of the gain of the compressor capacity controller and the gain of the evaporator, i.e. $K=K_p \cdot K_e$, where $K_p$ is the gain of the compressor capacity controller and $K_e$ is the gain of the evaporator. The gain of the compressor capacity controller, $K_p$, reflects how strongly the controller of the chiller system will adjust the compressor capacity in reaction to a change in the controlled monitored temperature. Similarly, the evaporator gain, $K_e$, reflects how much the monitored temperature changes in reaction to change in the cooling capacity, taking into account the relation between the flow rate of secondary fluid through the evaporator and the cooling capacity.

As mentioned above, since the speed of the pump is variable, it is possible to control the secondary fluid flow through the evaporator. Thus, when the cooling demand is low, a low pump speed can be selected, thereby reducing the energy consumption of the pump. Furthermore, when the cooling demand is higher, a higher pump speed can be selected, thereby ensuring that the required cooling capacity is available. Accordingly, the overall energy consumption of the chiller system is reduced, and it is ensured that the required cooling capacity is always available.

One problem with applying a variable speed pump is that the flow rate through the evaporator strongly affects the gain of the evaporator, $K_e$. Furthermore, when the compressor capacity as well as the speed of the variable speed pump is varied simultaneously, there is a risk that the variations of the compressor capacity and the variations of the speed of the variable speed pump counteract each other. Thereby the temperature of the secondary fluid will not change, and the control signal is lost. These problems are solved by controlling the compressor capacity and the speed of the variable speed pump in such a manner that the closed loop gain is kept substantially constant.

As mentioned above, when controlling the speed of the variable speed pump, the secondary fluid flow through the evaporator is controlled. Therefore, in the following control of the secondary fluid flow rather than control of the pump speed is discussed. It is noted that a skilled person, having knowledge of characteristics of the pump, will readily be able to calculate a pump speed from a fluid flow rate.

A controller, such as a proportional (P) or a proportional integral (PI) controller may be used for establishing the cooling capacity, using the controlled temperature as input. This controller will have a gain, $K_p$. For instance, if the controller is a proportional (P) controller, it may operate in accordance with the following equation:

$$Q=K_p \cdot (T_1 - T_{setpoint}),$$

where Q is the cooling capacity delivered by the compressor, $T_1$ is the monitored temperature, and $T_{setpoint}$ is a setpoint temperature for the monitored temperature.

As mentioned above the closed loop gain, K, must be kept constant. The exact constant value of K may, e.g., be provided by the user of the vapour compression system, and the value may be selected to be suitable for the chiller in question. The value of K is, thus, dependent on the design of the chiller, including the size of the chiller, as well as on a response time of the load on the system.

The evaporator gain, $K_e$, is a physical property of the system, i.e. it is not user defined, and therefore it must be computed. This could, e.g., be done on the basis of a physical model of the evaporator. Once $K_e$ has been computed in this manner, the controller gain, $K_p$, can be calculated as $K/K_e$.

The evaporator may be modelled using the first law of thermodynamics. The amount of heat removed per unit time from the secondary fluid must be equal to the cooling capacity delivered by the compressors, i.e.:

$$\varphi \cdot C_p \cdot (T_2 - T_1) = Q,$$

where $\varphi$ is the flow rate of the secondary fluid through the evaporator, $C_p$ is the specific heat of the secondary fluid, typically water, $T_2$ is the temperature of secondary fluid entering the evaporator, $T_1$ is the temperature of secondary fluid leaving the evaporator, and $Q$ is the cooling capacity delivered by the compressors.

The evaporator gain, $K_e$, can now be calculated as:

$$K_e = \frac{dT_1}{dQ} = \frac{Q}{C_p \varphi^2} \cdot \frac{d\varphi}{dQ} - \frac{1}{C_p \varphi}$$

Having computed $K_e$ in this manner, $K_p$ is calculated as $K_p = K/K_e$.

It is noted that, in the example above, as well as in the example below, it is assumed that the measured temperature is the temperature, $T_1$, of secondary fluid leaving the evaporator. However, similar examples could be produced in which the measured temperature is the temperature, $T_2$, of secondary fluid entering the evaporator. It is within the skills of a skilled person to perform the corresponding calculations.

For example, when the chiller system is controlled on the basis of the temperature of secondary fluid leaving the evaporator, and the flow rate is proportional to the cooling capacity, then the cooling capacity per unit mass of the secondary fluid flow will not change, and the temperature of the fluid leaving the evaporator will not be affected by the cooling capacity. In other words, the control action of changing the compressor capacity will not affect the controlled temperature. According to the definition of the $K_e$ above, this corresponds to the evaporator gain, $K_e$, being substantially zero, and therefore to the closed loop gain, $K = K_p \cdot K_e$, being substantially zero. This implies that the controller will fail. This is explained below.

If the flow rate of the secondary fluid through the evaporator is chosen as being proportional to the cooling capacity delivered by the compressor, then:

$$\varphi = n \cdot Q \Rightarrow \frac{d\varphi}{dQ} = n,$$

where n is a constant.

When calculating the evaporator gain, $K_e$, in this case, $K_e = 0$. Thus, the control action, i.e. changing the cooling capacity, dQ, will have no effect on the controlled temperature, $dT_1$, and the temperature, $T_1$, is therefore not controlled.

The speed of the variable speed pump may be controlled as a function of the cooling capacity of the chiller system. The cooling capacity of the chiller system is dependent on the compressor capacity. A good approximation is to assume that there is a linear correspondence between the cooling capacity and the compressor capacity. In this case the speed of the variable speed pump may be controlled as a function of the compressor capacity. According to this embodiment, the compressor capacity is controlled on the basis of the monitored temperature of the secondary fluid, and the speed of the variable speed pump is then controlled on the basis of the compressor capacity.

One possibility for obtaining this is to let the flow rate of the secondary fluid through the evaporator be proportional to the square root of the cooling capacity, i.e.:

$$\varphi = a \cdot \sqrt{Q} \Rightarrow \frac{d\varphi}{dQ} = \frac{a}{2 \cdot \sqrt{Q}}$$

where a is a user defined constant, which could, e.g., be determined from a flow rate which is desired at maximum cooling capacity.

In this case the evaporator gain, $K_e$, can be calculated as:

$$K_e = -\frac{1}{2 \cdot a \cdot C_p \cdot \sqrt{Q}}$$

The step of controlling the speed of the variable speed pump may comprise operating the variable speed pump at a constant minimum speed, when the cooling capacity is below a predetermined threshold value, and varying the speed of the variable speed pump as a function of the cooling capacity of the chiller system, when the cooling capacity is above the predetermined threshold value.

It is sometimes desirable to maintain some flow of secondary fluid through the evaporator, even when the cooling capacity is low. In order to ensure this, the variable speed pump can be operated at the minimum speed at low cooling capacity, i.e. when the cooling capacity is below the predetermined threshold value. When the cooling capacity reaches the threshold value, the speed of the variable speed pump is gradually increased as a function of the cooling capacity of the chiller system. The minimum speed may advantageously be selected in such a manner that the speed of the variable speed pump is varied in a continuous manner. This may be obtained by selecting the speed corresponding to the threshold value as the minimum value.

According to this embodiment, when the cooling capacity is below the predetermined threshold value, the flow rate is constant, and thereby its derivative ($d\varphi/dQ$) is equal to zero. Thereby the evaporator gain, $K_e$, becomes:

$$K_e = -\frac{1}{C_p \cdot \varphi}$$

Since the specific heat, $C_p$, as well as the flow rate, $\varphi$, is constant, the evaporator gain, $K_e$, is also constant in this case.

The compressor capacity and the speed of the variable speed pump may be controlled in such a manner that the gain of the evaporator, $K_e$, is kept at a substantially constant level. The constant level of the evaporator gain, $K_e$, should be non-zero, since a zero evaporator gain would result in loss of the control signal, as described above.

One example of this could be to select the flow rate as:

$$\varphi = \frac{Q}{A \cdot Q + B}$$

where A and B are user defined constants, which could, e.g., be determined from a flow rate which is desired at maximum cooling capacity, and a desired variation of the flow rate in response to variations in the cooling capacity.
Then:

$$\frac{d\varphi}{dQ} = \frac{B}{(A \cdot Q + B)^2}$$

$K_e$ can then be calculated as:

$$K_e = -\frac{A}{C_p}$$

Since the specific heat, $C_p$, and A are both constant, $K_e$ is also constant in this case. Furthermore, since the evaporator gain, $K_e$, is constant, the controller gain, $K_p$, will also be constant. It may be an advantage to control the chiller system in this manner, because thereby it is not necessary to compute $K_p$ each time the cooling capacity changes. Thereby the implementation in an actual controller becomes simple, and the program will execute faster.

As an alternative, the gain of the evaporator, $K_e$, may be allowed to vary, as long as the gain of the compressor capacity controller, $K_p$, is also varied in such a manner that the closed loop gain, K, is kept substantially constant.

It is an advantage of the present invention, that it is possible to keep the closed loop gain, K, constant, not only when the pump is operated in fixed speed mode, but also when the pump is operated in variable speed mode, including during a transition from fixed speed mode to variable speed mode. This is obtained because the controller gain, $K_p$, used in constant speed mode and the controller gain, $K_p$, used in variable speed mode are both calculated to match the evaporator gain, $K_e$, in each of these modes, in such a manner that the same closed loop gain, K, is obtained when the transition occurs.

The step of monitoring a temperature of the secondary fluid flow may comprise monitoring a temperature of fluid leaving the evaporator, i.e. the temperature of the secondary fluid after heat exchange has taken place with the refrigerant in the evaporator. As an alternative, the temperature of fluid entering the evaporator may be monitored.

The compressor may be a variable speed compressor, and the step of controlling the compressor capacity may be performed by controlling the speed of the variable speed compressor. As an alternative, the compressor may be in the form of a compressor rack comprising two or more compressors, and the step of controlling the compressor capacity may be performed by switching compressors on or off.

The secondary fluid may be a liquid, such as water or brine. As an alternative, the secondary fluid may be at least partly gaseous, and the secondary fluid may be at least partly condensed when passing through the evaporator. This is, e.g., the case in a pumped $CO_2$ system, where the secondary fluid is $CO_2$.

The method may further comprise the step of estimating a flow rate of the secondary fluid flow, based on the speed of the variable speed pump. For instance, it may be assumed that the flow rate is proportional to the speed of the variable speed pump.

BRIEF DESCRIPTION OF THE DRAWINGS

The invention will now be described in further detail with reference to the accompanying drawings in which.

DETAILED DESCRIPTION

Figure 1:
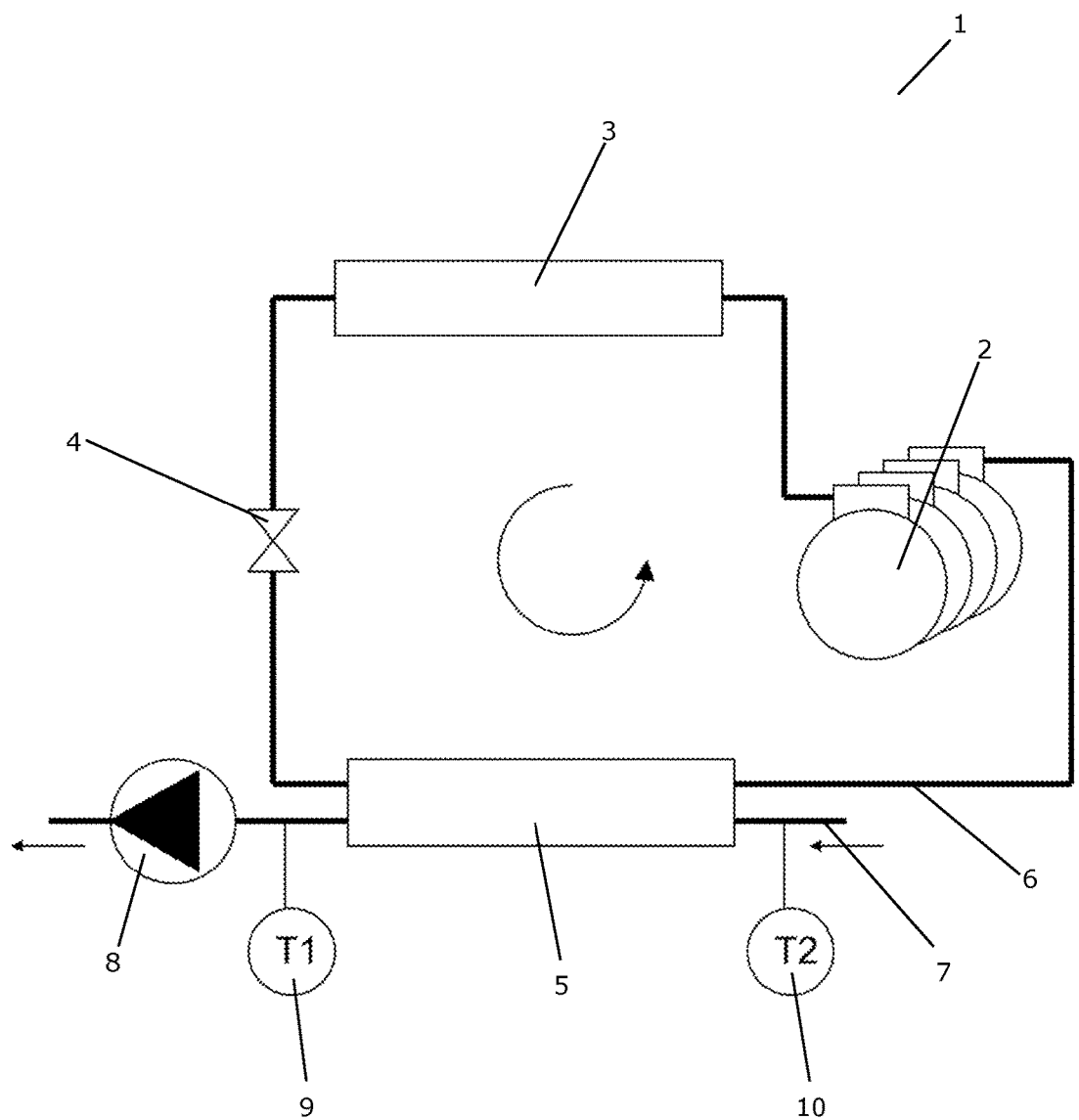
FIG. 1 is a diagrammatic view of a chiller system adapted to be controlled in accordance with a method according to an embodiment of the invention.

FIG. 1 is a diagrammatic view of a chiller system 1. The chiller system 1 comprises a primary side and a secondary side. The primary side comprises a compressor 2, a heat rejecting heat exchanger 3, an expansion device 4, in the form of an expansion valve, and an evaporator 5, arranged along a refrigerant path 6. Refrigerant flows in the refrigerant path 6, and is alternatingly compressed in the compressor 2 and expanded in the expansion device 4. Heat exchange takes place in the heat rejecting heat exchanger 3 and in the evaporator 5. Thus, the primary side of the chiller system 1 forms a vapour compression system.

The compressor 2 is in the form of a compressor rack comprising a number of compressors, four of which are shown.

The secondary side comprises a secondary fluid path 7 having a secondary fluid flowing therein, and a variable speed pump 8 for driving the secondary fluid flow. The secondary fluid path 7 leads the secondary fluid through the evaporator 5. Thereby heat exchange takes place between the refrigerant flowing in the refrigerant path 6 and secondary fluid flowing in the secondary fluid path 7. The heat exchange takes place in such a manner that heat is transferred from the secondary fluid to the refrigerant.

A first temperature sensor 9 is arranged in the secondary fluid path 7 at an outlet opening of the evaporator 5. Thus, the first temperature sensor 9 measures the temperature of secondary fluid leaving the evaporator 5, i.e. after heat exchange with the refrigerant has taken place.

Similarly, a second temperature sensor 10 is arranged in the secondary fluid path 7 at an inlet opening of the evaporator 5. Thus, the second temperature sensor 10 measures the temperature of secondary fluid entering the evaporator 5, i.e. before heat exchange with the refrigerant takes place.

The secondary fluid path 7 is preferably a closed loop, leading the secondary fluid past one or more heat sources (not shown). The heat source(s) may, e.g., be in the form of air conditioning units arranged in one or more rooms or in the form of one or more refrigeration cabinets in a supermarket. When the secondary fluid passes through the heat source(s), the secondary fluid is heated. When the secondary fluid subsequently passes through the evaporator 5, it is cooled due to the heat exchange with the refrigerant. Thereby heat is transferred from the heat source(s) to the primary side of the chiller system 1, via the secondary fluid.

The chiller system 1 of FIG. 1 may be controlled in accordance with a method according to an embodiment of the invention. To this end, a temperature signal provided by the first temperature sensor 9 and/or a temperature signal provided by the second temperature sensor 10 is/are used as input for a controller. Based on the temperature signal(s) the controller provides control signals for the compressor 2 and for the pump 8. The compressor capacity and the speed of the variable speed pump 8 are then controlled in such a manner that the closed loop gain of the chiller system 1 is kept substantially constant. This will be described in further detail below.

Figure 2:
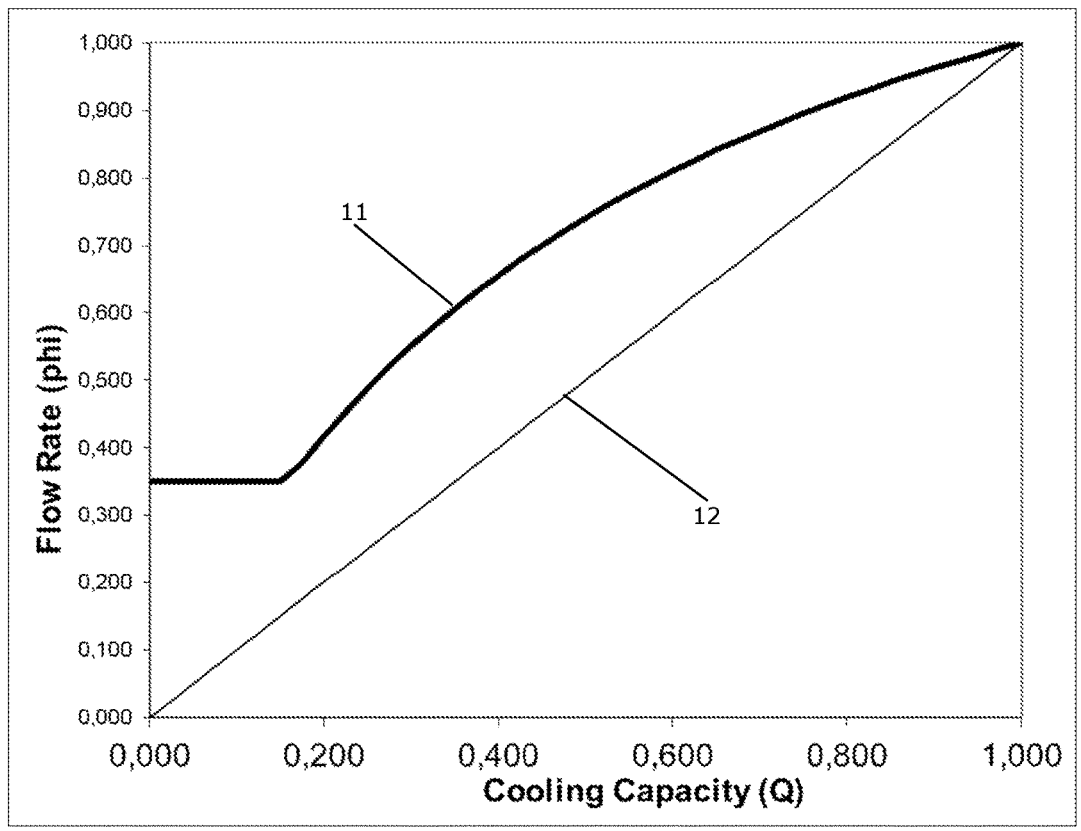
FIG. 2 is a graph illustrating flow rate of secondary fluid through an evaporator as a function of cooling capacity.

FIG. 2 is a graph illustrating flow rate 11 of a secondary fluid through an evaporator as a function of cooling capacity of a chiller system being controlled in accordance with an embodiment of the invention. The chiller system being controlled may, e.g., be the chiller system shown in FIG. 1. Since the flow rate 11 is determined by the speed of the variable speed pump, the curve 11 of FIG. 2 provides information regarding which speed of the variable speed pump to select for a given cooling capacity, in order to obtain that the closed loop gain of the chiller system is kept substantially constant.

At low cooling capacity, the flow rate 11 is kept at a constant minimum level, until a predetermined threshold value of the cooling capacity is reached. Thereby it is ensured that a secondary fluid flow is always flowing through the evaporator, even if the cooling capacity is very low. At higher cooling capacity, the flow rate 11 is gradually increased, following a convex curve, until maximum flow rate is reached at maximum cooling capacity.

The diagonal curve 12 represents a proportional relationship between the cooling capacity and the flow rate at which both the evaporator gain $K_e$ and the close loop gain $K=K_p \cdot K_e$ are substantially zero as explained above. As a result, control becomes substantially impossible.

Figure 3:
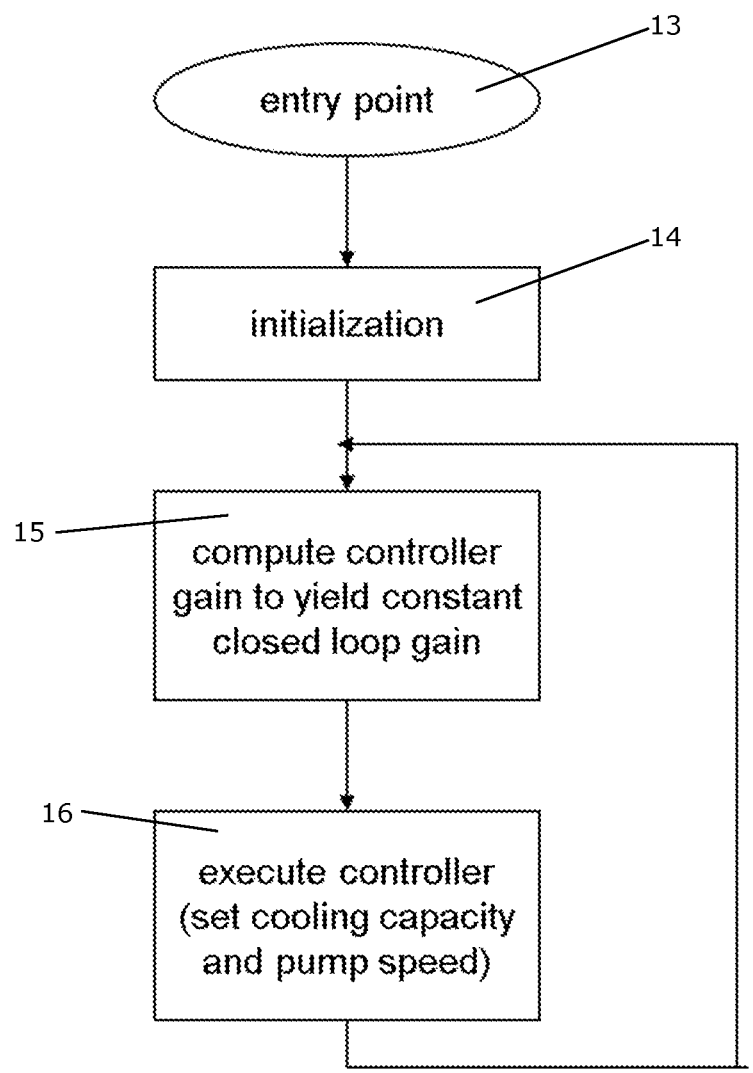
FIG. 3 is a flow diagram illustrating a method according to an embodiment of the invention.

FIG. 3 is a flow diagram illustrating a method for controlling a chiller system according to an embodiment of the invention. The chiller system being controlled may, e.g., be the chiller system illustrated in FIG. 1.

The process is started at step 13, and the system is initialized at step 14. At step 15 a controller gain, $K_p$, is computed in order to yield a substantially constant closed loop gain. This is done on the basis of the compressor capacity and the flow rate of the secondary fluid. The output of step 15 is the controller gain, $K_p$, which is supplied to the controller.

At step 16 the controller is executed, i.e. the compressor capacity and the flow rate of the secondary fluid flow are computed, and the computed settings are supplied to the compressor and the variable speed pump, respectively. The compressor capacity may, e.g., be set by adjusting the speed of a variable speed compressor, or by switching individual compressors of a compressor rack on or off.

Finally, the process is returned to step 15 in order to continue computing settings and setting the compressor capacity and pump speed in accordance with the computed settings.

Figure 4:
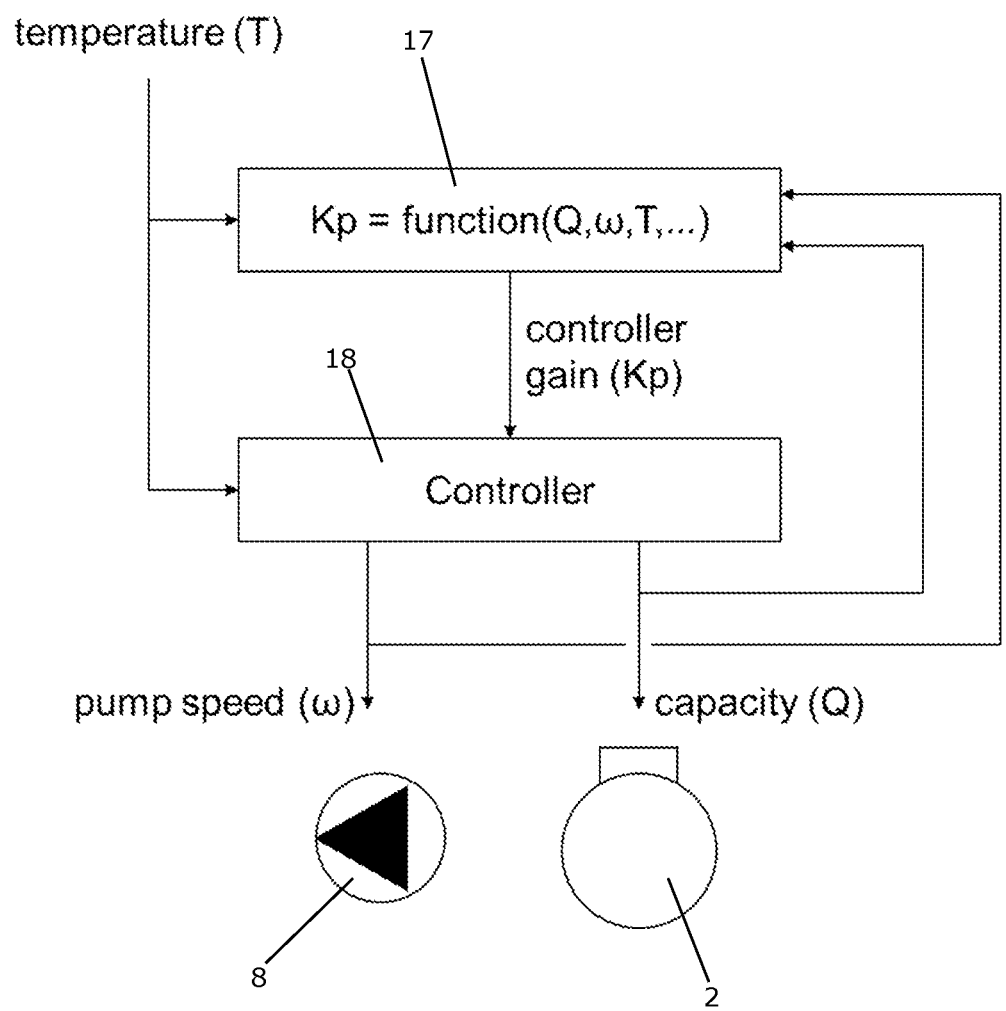
FIG. 4 is a block diagram illustrating a method according to an embodiment of the invention.

FIG. 4 is a block diagram illustrating a method for controlling a chiller system according to an embodiment of the invention. A temperature (T) of a secondary fluid is measured, e.g. by means of one of the temperature sensors shown in FIG. 1, and supplied to a gain calculator 17 and to a controller 18. Based on the supplied temperature value (T), and on feedback signals representing pump speed (ω) of a variable speed pump and compressor capacity (Q) of a compressor of variable capacity, the gain calculator 17 calculates a gain ($K_p$) of the controller, and supplies the calculated gain ($K_p$) to the controller 18.

Based on the calculated gain ($K_p$) and on the temperature value (T), the controller 18 calculates settings for the speed (ω) of the variable speed pump 8 and for the capacity (Q) of the compressor 2. The calculated settings are supplied to the variable speed pump 8 and the compressor 2, respectively, and the speed of the pump 8 and the capacity of the compressor 2 are adjusted in accordance with the calculated settings. Furthermore, the calculated settings are supplied to the gain calculator 17, and are used as a basis for calculating the gain ($K_p$) of the controller.

The calculation of the controller gain ($K_p$) performed by the gain calculator 17, and of the settings performed by the controller 18, are performed in such a manner that the closed loop gain of the chiller system is kept substantially constant. Thereby it is ensured that the speed of the variable speed pump 8 can be varied, thereby saving energy when the cooling capacity is low, without risking that the control signal is lost.

What is claimed is:

1. A method for controlling a chiller system, the chiller system comprising a primary side and a secondary side, the primary side comprising a compressor with variable capacity, a heat rejecting heat exchanger, an expansion device, and an evaporator arranged in a refrigerant path, and the secondary side comprising a variable speed pump for providing a secondary fluid flow through the evaporator in such a manner that heat exchange takes place between refrigerant of the primary side and fluid of the secondary side in the evaporator, the secondary side further comprising a temperature sensor arranged in the secondary fluid flow, the method comprising the steps of:

monitoring a temperature of the secondary fluid flow by means of the temperature sensor, controlling the variable capacity and a speed of the variable speed pump on the basis of the monitored temperature to obtain a predetermined setpoint temperature, and keeping the closed loop gain of the chiller system constant by controlling the variable capacity and the speed of the variable speed pump, wherein the closed loop gain of the chiller system is defined as $K=K_p \cdot K_e$, where $K_p$ is a gain of a compressor capacity controller and $K_e$ is a gain of the evaporator wherein the variable capacity and the speed of the variable speed pump are controlled in such a manner that the gain of the evaporator, $K_e$, is kept constant.

2. The method according to claim 1, wherein the speed of the variable speed pump is controlled as a function of a cooling capacity of the chiller system.

3. The method according to claim 2, wherein the step of controlling the speed of the variable speed pump comprises operating the variable speed pump at a constant minimum speed when the cooling capacity is below a predetermined threshold value, and varying the speed of the variable speed pump as a function of the cooling capacity of the chiller system when the cooling capacity is above the predetermined threshold value.

4. The method according to claim 1, wherein the step of monitoring the temperature of the secondary fluid flow comprises monitoring a fluid temperature of fluid leaving the evaporator.

5. The method according to claim 1, wherein the compressor is a variable speed compressor, and wherein the step of controlling the variable capacity is performed by controlling the speed of the variable speed compressor.

6. The method according to claim 1, wherein the secondary fluid is a liquid.

7. The method according to claim 1, further comprising a step of estimating a flow rate of the secondary fluid flow, based on the speed of the variable speed pump.

8. The method according to claim 2, wherein the step of monitoring the temperature of the secondary fluid flow comprises monitoring a fluid temperature of fluid leaving the evaporator.

9. The method according to claim 3, wherein the step of monitoring the temperature of the secondary fluid flow comprises monitoring a fluid temperature of fluid leaving the evaporator.

10. The method according to claim 1, wherein the step of monitoring the temperature of the secondary fluid flow comprises monitoring a fluid temperature of fluid leaving the evaporator.

11. The method according to claim 2, wherein the compressor is a variable speed compressor, and wherein the step of controlling the variable capacity is performed by controlling the speed of the variable speed compressor.

12. The method according to claim 3, wherein the compressor is a variable speed compressor, and wherein the step of controlling the variable capacity is performed by controlling the speed of the variable speed compressor.

13. The method according to claim 1, wherein the compressor is a variable speed compressor, and wherein the step of controlling the variable capacity is performed by controlling the speed of the variable speed compressor.

14. The method according to claim 4, wherein the compressor is a variable speed compressor, and wherein the step of controlling the variable capacity is performed by controlling the speed of the variable speed compressor.

15. The method according to claim 2, wherein the secondary fluid is a liquid.

16. The method according to claim 3, wherein the secondary fluid is a liquid.

17. The method according to claim 1, wherein the secondary fluid is a liquid.

* * * * *